United States Patent [19]

Akashi

[11] Patent Number: 5,053,799
[45] Date of Patent: Oct. 1, 1991

[54] CAMERA HAVING AUTO-FOCUSING DEVICE

[75] Inventor: Akira Akashi, Yokohama, Japan

[73] Assignee: Canon Kabushiki Kaisha, Tokyo, Japan

[21] Appl. No.: 653,747

[22] Filed: Feb. 11, 1991

Related U.S. Application Data

[63] Continuation of Ser. No. 550,195, Jul. 10, 1990, abandoned, which is a continuation of Ser. No. 312,312, Feb. 17, 1989, abandoned, which is a continuation of Ser. No. 138,154, Dec. 28, 1987, abandoned.

[51] Int. Cl.$^5$ .................. G03B 13/36; G03B 17/38
[52] U.S. Cl. ..................................... 354/402; 354/266
[58] Field of Search ............... 354/400, 402–408, 354/412, 173.1, 173.11, 266

[56] References Cited

U.S. PATENT DOCUMENTS

| | | | |
|---|---|---|---|
| 4,411,505 | 10/1983 | Sakai et al. | 354/406 |
| 4,435,058 | 3/1984 | Yoshida et al. | 354/403 |
| 4,459,006 | 7/1984 | Sakai et al. | 354/406 |
| 4,464,037 | 8/1984 | Terui et al. | 354/266 X |
| 4,474,447 | 10/1984 | Kawabata et al. | 354/406 |
| 4,687,915 | 8/1987 | Sakai et al. | 354/402 X |
| 4,688,914 | 8/1987 | Sakai et al. | 354/173.11 |
| 4,723,139 | 2/1988 | Ogasawara et al. | 354/402 |
| 4,792,821 | 12/1988 | Akashi | 354/402 |
| 4,888,609 | 12/1989 | Hamada et al. | 354/402 |
| 4,922,279 | 12/1989 | Hamada et al. | 354/400 |

Primary Examiner—W. B. Perkey
Attorney, Agent, or Firm—Fitzpatrick, Cella, Harper & Scinto

[57] ABSTRACT

A camera having an auto-focussing device. When the camera is operated for continuous shooting, in order to shorten the time required for a focussing operation performed during each pause between shots to be less than that required in the repeated cycles of focussing operations performed in single-frame shooting, the focussing operation is restricted to a limited number of cycles, such as once, even if an in-focus state has not been obtained as a result of focus adjustment, thereby shortening the pauses between shots during continuous shooting.

17 Claims, 6 Drawing Sheets

CAMERA HAVING AUTO-FOCUSING DEVICE

This application is a continuation of application Ser. No. 550,195, filed July 10, 1990, which is a continuation of application Ser. No. 312,312, filed Feb. 17, 1989, which in turn is a continuation of application Ser. No. 138,154, filed Dec. 28, 1987, all now abandoned.

BACKGROUND OF THE INVENTION

1. Field of the Invention

The present invention relates to a camera having an auto-focussing device.

2. Related Background Art

Hitherto, as one type of focussing device for a camera, there is known a method in which an exit pupil of a photographic lens is divided into two areas by an optical system used to detect the focus. Two images of an object, each formed by rays passing through an aperture area, are received by photoelectric conversion element arrays (e.g., CCD sensor arrays). The focus state of the photographic lens is detected from outputs thereof, and the photographic lens is driven on the basis of the detection results.

In addition one form of usage of the camera is a photography state called "continuous shooting" in which shooting is effected repeatedly and continuously while the film is wound by an externally-attached motor drive unit or a built-in winder. In this state, a method is adopted in which the above-described focussing operation is carried out during each pause between the shooting of one frame and the winding of the film.

However, if, in the above-described continuous shooting state, an arrangement is made to delay the next shot until the in-focus state is obtained, and if an object for which focus control is difficult is being photographed, the shooting of the next frame is delayed by the time required by the focussing operation until that in-focus state is obtained. This results in very poor operational characteristics, in view of the fact that continuous shooting is often used to follow a moving object.

In addition, when the focus detection is effected by using an image storage-type sensor, such as a CCD, in a focus detection operation during focussing in the above-described continuous shooting, if the storage time is controlled in such a manner that the level of the stored image obtained by the sensor reaches an appropriate value, a longer storage time is required if the illumination is low, so that it is likely that the purpose of continuous shooting cannot be attained.

SUMMARY OF THE INVENTION

Accordingly, an object of the present invention is to provide a camera having an automatic focussing device in which restrictions are imposed on the frequency of focus-detecting and lens-driving operations which are carried out for each frame in continuous shooting, thereby enabling photography to be effected within short periods.

To this end, the present invention provides, according to one aspect of the invention, a camera having an auto-focussing device which imposes restrictions to a predetermined time with respect to the time required in lens driving in continuous shooting, thereby shortening shooting intervals.

According to another aspect of the invention, there is provided a camera having an auto-focussing device which sets a maximum image storage time in a sensor during focus detection in continuous shooting to less than a maximum time in the normal mode, thereby shortening the shooting intervals in continuous shooting.

The above and other objects, features and advantages of the present invention will become apparent from the following detailed description of the invention when read in conjunction with the accompanying drawings.

DESCRIPTION OF THE PREFERRED EMBODIMENT

Figure 1:
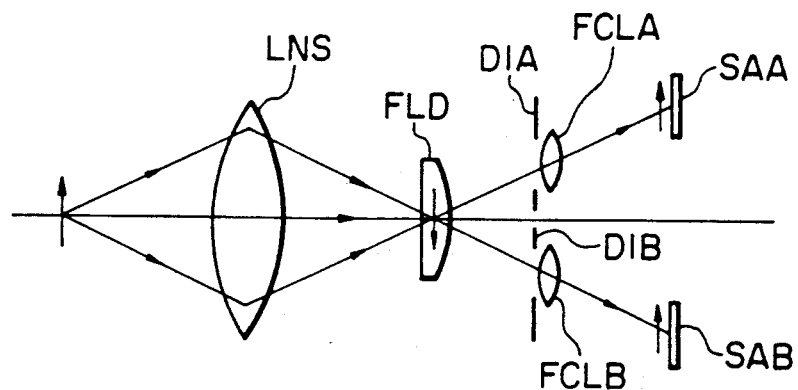
FIG. 1 is a diagram schematically illustrating the optical principle of a focussing device in accordance with the present invention.

Referring now to FIG. 1, a description will be given of the basic principle of focus detection in accordance with the present invention. A photographic lens LNS, whose focusing is to be detected, and a field lens FLD are arranged on the same optical axis. Two secondary image-forming lenses FCLA, FCLB are arranged to the rear thereof at positions symmetrical about the optical axis. Sensor arrays SAA, SAB are disposed further to the rear thereof. Diaphragms DIA, DIB are disposed in the vicinity of the secondary image-forming lenses FCLA, FCLB. The field lens FLD forms images from the exit pupil of the photographic lens LNS approximately onto the pupil surfaces of the two secondary image-forming lenses FCLA, FCLB. As a result, rays incident upon the secondary image-forming lenses FCLA, FCLB, respectively, emerge from equal areas which correspond with the secondary image-forming lenses FCLA, FCLB and do not overlap each other. When in-air images formed in the vicinity of the field lens FLD are reformed in the planes of the sensor arrays SAA, SAB by the secondary image-forming lenses FCLA, FCLB, the positions of the two images on the sensor arrays SAA, SAB vary on the basis of the displacement of the positions of the in-air images along the optical axis. Accordingly, if the sensor arrays could detect the magnitude of displacement (offset) of the relative positions of the two images on the sensor arrays, it would be possible to determine the focus state of the photographic lens LNS.

Figure 2:
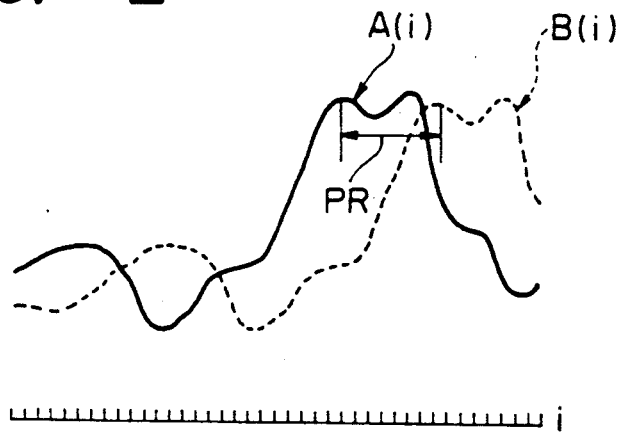
FIG. 2 is a waveform diagram illustrating the status of outputs of sensors SAA, SAB of FIG. 1.

FIG. 2 illustrates an example of outputs of photoelectric signals of the two images formed on the sensor arrays SAA, SAB. Assume that the output of SAA is A(i), while the output of SAB is B(i). Incidentally, in this example, the number of picture elements of each sensor is assumed to be 40 (i=0, ..., 39).

Signal processing methods for detecting the magnitude of offset PR from the image signals A(i), B(i) have been disclosed by the present applicant in Japanese Patent Laid-Open Nos. 142306/1983, 107313/1984, and 101513/1985 and Japanese Patent Application No. 160824/1986.

The photographic lens can be set in the in-focus state by focussing the photographic lens on the basis of the magnitude of image offset obtained by the methods disclosed in these publications.

Figure 3:
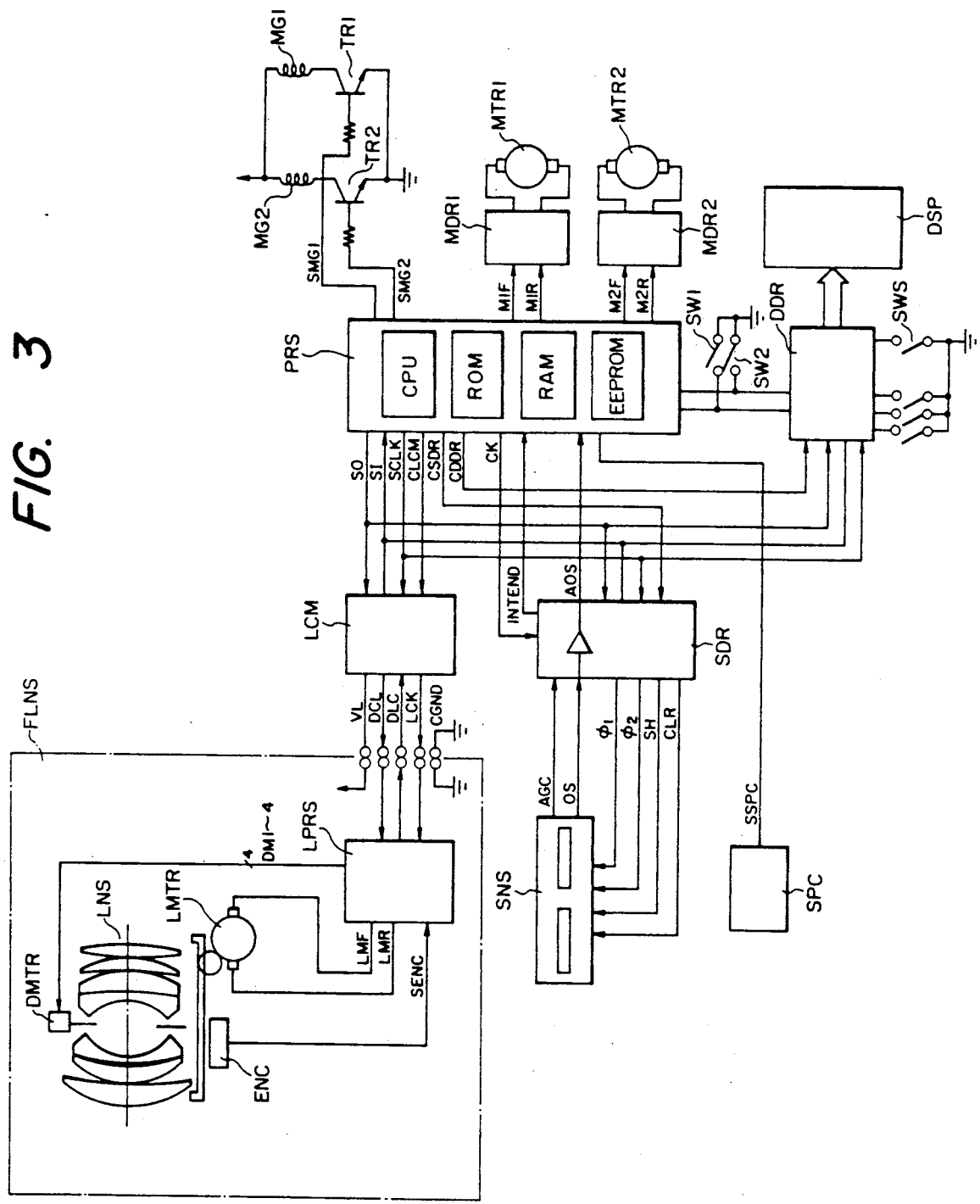
FIG. 3 is a circuit diagram illustrating an embodiment of a camera employing the present invention.

FIG. 3 is a circuit diagram illustrating an embodiment of a camera having an auto-focussing device in accordance with the present invention.

In the drawing, PRS denotes a camera controller constituted by, for instance, a one-chip microcomputer incorporating a CPU (central processing unit), a ROM, a RAM, an electrically erasable programmable ROM (EEPROM), and an A/D conversion function. The PRS performs camera operations including an automatic exposure control function, an automatic focus detection function, and film wind-up and unwinding operations. The EEPROM is a type of nonvolatile memory in which various control data are written in a relevant process.

The PRS communicates with peripheral circuits and the lens by means of communication signals SO, SI, and SCLK to control the operations of various circuits and the lens.

SO denotes a data signal output from PRS; SI, a data signal input to PRS; and SCLK, a synchronizing signal for the signals SO, SI.

LCM denotes a lens communication buffer circuit. This buffer circuit supplies the power from a power supply VL for the lens when the camera is being operated, and serves as a buffer for communication between the camera and the lens when the voltage level of a signal CLCM from PRS is high.

When the microcomputer PRS sets the level of CLCM to high (hereinafter "H") and sends predetermined data from SO in synchronization with SCLK, the buffer circuit LCM outputs respective buffer signals LCK, DCL of SCLK and SO via contacts between the camera and the lens. Simultaneously, the buffer circuit LCM outputs as SI the buffer signal of a signal DLC from the lens, and the computer PRS then inputs data on the lens from the signal SI in synchronization with SCLK.

SDR denotes a drive circuit for a line sensor unit SNS for focus detection. This drive circuit SDR is selected when the level of a signal CSDR is "H", and is controlled by PRS using SO, SI, and SCLK.

A signal CK is a clock signal for generating clock pulses $\phi 1$, $\phi 2$ for driving CCDs, while a signal INTEND is a signal for informing the microcomputer PRS that a storage operation has been completed.

An output signal OS of the sensor SNS is a time-series image signal (stored image signals in picture elements of image light received by picture elements of the sensor arrays SAA, SAB of the sensor) synchronized with the clock pulses $\phi 1$, $\phi 2$. The output signal OS is output to the microcomputer PRS as an AOS signal after it is amplified by an amplifying circuit in the SDR. The microcomputer PRS inputs the AOS signals from an analog input terminal, and, in synchronization with CK, sequentially stores the signals in predetermined addresses of the RAM after being A/D converted by the internal A/D conversion function.

AGC which is also an output signal of the sensor unit SNS is an output of an AGC controlling sensor in the sensor unit SNS, and is input to the drive circuit SDR so as to be used in controlling the storage of image signals in each of the sensors SAA, SAB of the sensor unit SNS. A series of the operations of the circuit SDR will be described later in detail.

SPC denotes an exposure-controlling photometric sensor which receives the light transmitted through the photographic lens, and its output SSPC is input to an analog input terminal of the microcomputer PRS, and is used for automatic exposure control (AE) after it is subjected to A/D conversion.

DDR denotes a switch sensor and a display circuit, which is selected when the level of a signal CDDR is "H", and is controlled by the microcomputer PRS by using SO, SI, and SCLK. In other words, DDR is used to change over the display of a display member DSP of the camera on the basis of data supplied from the microcomputer PRS and to communicate with the microcomputer PRS the ON/OFF statuses of a group of switches SWS which are interlinked with various controlling members, including a shutter release button (not shown and interlinked with the operations of switches SW1, SW2) and a mode setting button.

MDR1, MDR2 denote drive circuits for shutter charge motors MTR1, MTR2, and execute the forward and reverse rotation of the motors by signals M1F, M1R, M2F, and M2R. MG1, MG2 respectively denote magnets for starting the traveling of front and rear curtains of the shutter. The magnets MG1, MG2 are energized by amplification transistors TR1, TR2 in response to signals SMG1, SMG2, and the shutter is controlled by the microcomputer PRS.

Incidentally, since the control of the switch sensor, display circuit DDR, motor driving circuits MDR1, MDR2, and shutter is not directly related to the present invention, a detailed description thereof will be omitted.

The signal DCL which is input to an in-lens drive circuit LPRS in synchronization with the LCK signal represents data on instructions from the camera to the lens FLNS, and the operation of the lens with respect to the instructions is predetermined.

The LPRS analyzes the instructions in accordance with a predetermined procedure and effects operations of focussing and aperture control and outputs various parameters of the lens (i.e., full-aperture F-number, focal length, a coefficient of an amount of extension to an amount of defocus) from the output DLC.

The embodiment shows an example of a single lens of a type in which the entire portion of the lens is extended. When an instruction for focussing is sent from the camera, the optical system is moved along the optical axis by driving a focussing motor LMTR by signals LMF, LMR in accordance with signals on the amount and direction of drive that are simultaneously transmitted from the camera, thereby effecting the focussing. An amount of movement of the optical system is monitored by a pulse signal SENC from an encoder circuit ENC constituted by, for instance, a pulse plate or the like which rotates in an interlinking relationship with the movement of the optical system and outputs a number of pulses corresponding to the amount of movement, and the pulses are counted by a counter in the LPRS. When the predetermined movement is completed, the levels of the signals LMR, LMR are set to low (hereinafter "L") to stop the motor LMTR.

When an instruction for controlling the diaphragm is sent from the camera, a known stepping motor DMTR for driving the diaphragm is driven in accordance with the number of aperture stages that is transmitted simultaneously.

Referring now to the flowcharts shown in FIGS. 4A to 4F, a description will be given of the operation of the camera having the above-described arrangement.

If a power switch (not shown) is operated, the supply of power to the microcomputer PRS is started, and the PRS starts executing a sequence program stored in the ROM.

Figure 4A:
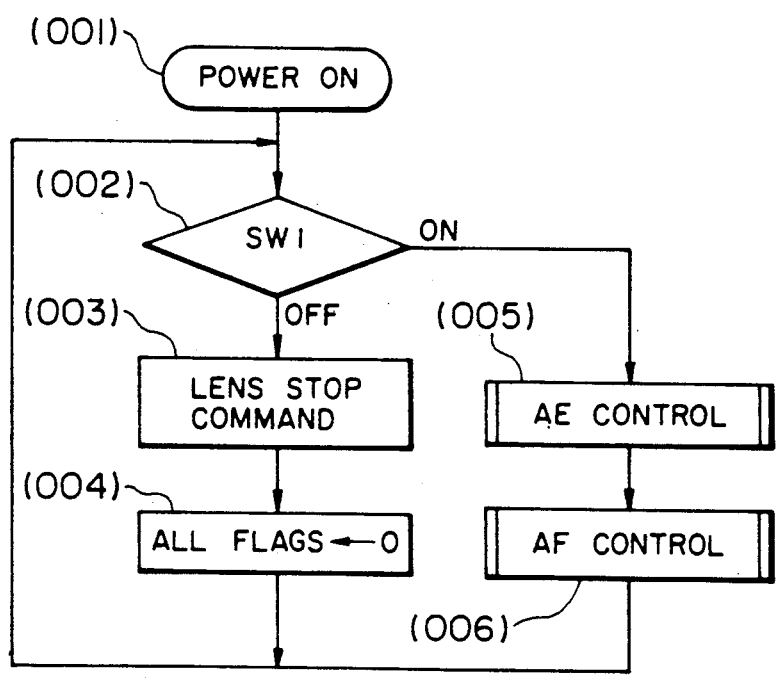
FIGS. 4A to 4F are flowcharts of programs illustrating the operation of the camera in accordance with the present invention.

FIG. 4A is a flowchart illustrating the entire flow of the aforementioned program. When the execution of the program is commenced by the aforementioned operation, the status of the switch SW1 which is turned ON in a first stroke of the shutter release button is detected in Step 002. When the switch SW1 is OFF, in Step 003, the level of CLCM is set to "H" by the microcomputer PRS, and an instruction for stopping the driving operation is given by sending a "LENS STOP COMMAND" as the SO signal to the lens via the circuit LCM. In the following Step 004, all the flags and variables for control that are set in the RAM in the PRS are cleared. The above Steps 002, 003, and 004 are executed repeatedly until the switch SW1 is turned ON, or until the power switch is turned OFF. Accordingly, even when the lens is being driven, the driving of the lens is stopped if the SW1 is turned OFF. Incidentally, the detection of the status of the SW1 is executed by setting the level of the signal CDDR to "H" to instruct the circuit DDR, by sending an instruction for detection by the switch SW1 to the circuit DDR as the signal SO, and by supplying the status signal of the switch SW1 to the microcomputer PRS as the signal SI. When the SW1 is turned ON, the operation proceeds to Step 005. Step 005 means a subroutine of "AE control". In this "AE control" subroutine, the photometric operation processing and exposure control, as well as the control of a series of camera operations including the shutter charge after exposure and the film wind-up operation, are performed. Incidentally, since the "AE control" subroutine is not directly related to the present invention, a detailed description thereof will be omitted, but an outline of the functions of this subroutine is as follows.

When the SW1 is ON, this "AE control" subroutine is executed, and photometry, exposure control operation, and display are effected on each such occasion. When the switch SW2 is turned ON in a second stroke of the shutter release button (not shown), a releasing operation is started by an interruption handling function of the microcomputer PRS, and the control of the diaphragm or the shutter time is carried out on the basis of the amount of exposure determined by the aforementioned exposure control operation. After completion of the exposure, the photographing of one film frame is completed by effecting the shutter charge and a film feeding operation.

It should be noted that the camera in accordance with the embodiment of the present invention has two modes of "one-shot" and "servo" as AF modes. When the AF mode is one-shot, the arrangement is such that, once the in-focus state is obtained, the focussing operation is not carried out again until the switch SW1 is turned OFF, and the shutter cannot be released until the in-focus state is obtained.

In the case of the servo mode, the focussing is carried out continuously after the in-focus state has been obtained, and the shutter can be released irrespective of the result of focus detection. Accordingly, the interruption processing is allowed if the lens is focussed in the case of the one-shot mode. In the case of the servo mode, however, the interruption processing is always allowed, but is prohibited temporarily after a releasing operation, and is allowed again after the "AF control" subroutine is executed in the next Step 006. The selection of one-shot and servo modes is effected by a mode selection switch (not shown).

As described earlier, the shutter release operation is effected when the switch SW2 is turned ON. However, in both cases where the photographing of one film frame has been completed and where the SW2 remains turned ON, a return is effected by assuming that the "AE control" has been completed. Accordingly, if a description is given of the operation with the SW2 turned ON, in the case of the one-shot mode, releasing cannot be effected until the lens is focussed, and releasing becomes possible only when the lens is focussed, and photographing of one frame can then be carried out. Subsequently, the focussing is not carried out since the mode is one-shot, and the photographing of the next frame is carried out in the same lens position, and the photographing is executed continuously while the switch SW2 is turned ON.

In the case of servo, since the shutter can be released at any time, shooting is effected immediately when the SW2 is turned ON. Subsequently, after the focussing is carried out once in the "AF control" routine, the shutter becomes releasable again, and shooting is effected. Consequently, while the SW2 is turned ON, the "releasing operation" and the "AF control" are repeated alternately. Such a state will be hereafter referred to as "AF continuous shooting", and, in order to recognize this state in the "AF control" routine which will be described later, a flag RLS is set to 1 in the "AE control" subroutine after the shutter release operation.

When the "AE control" subroutine is completed in Step 005, as described above, the "AF control" subroutine in Step 006 is executed.

Figure 4B:
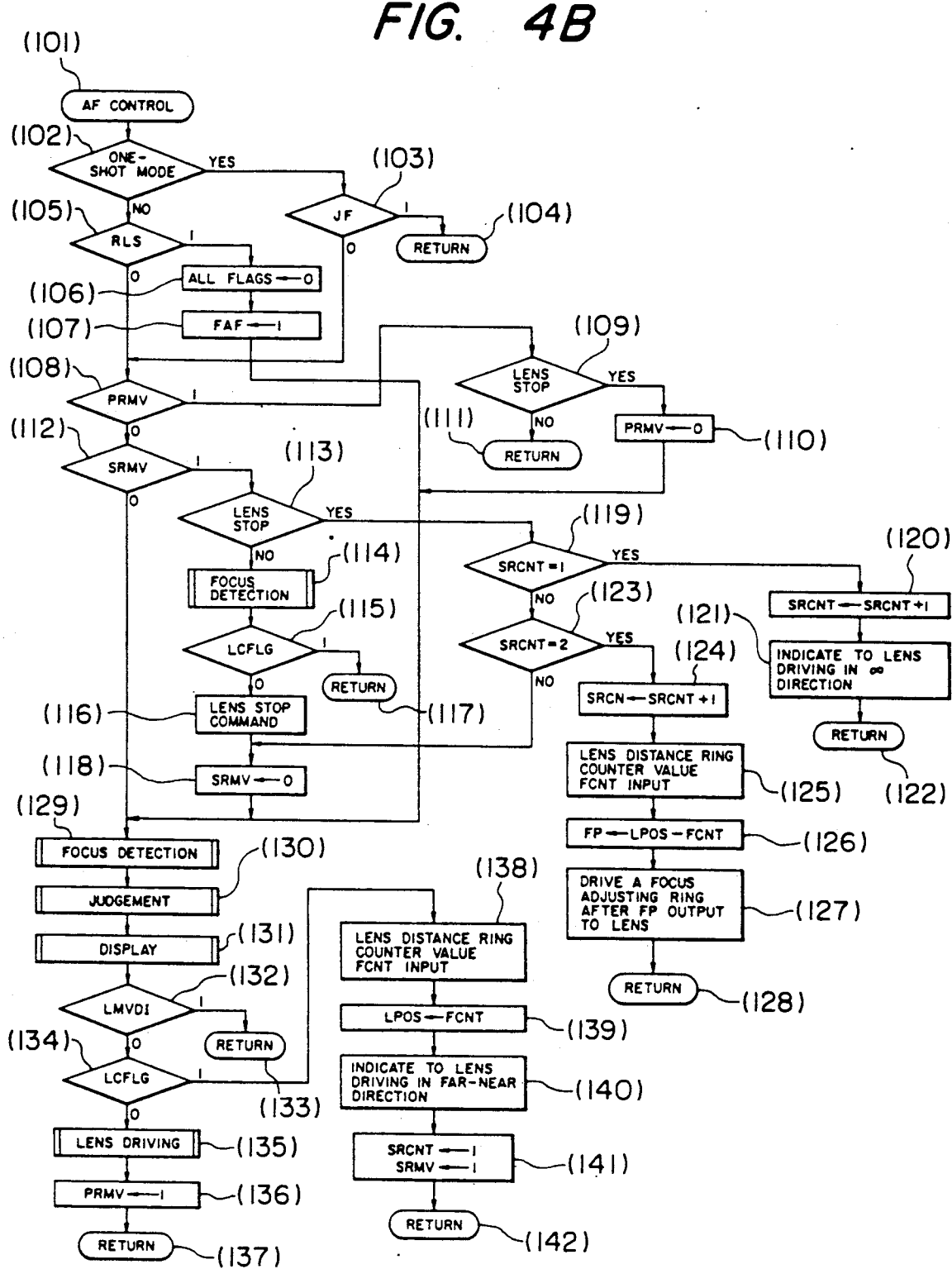

FIG. 4B shows a flowchart of the "AF control" subroutine. First, in Step 102, the status of the AF mode is detected. This is done by determining the status of the AF mode setting switch (not shown) by communicating with the switch sensing circuit DDR in the same manner as the detection of the switch SW1.

If the AF mode is one-shot, the operation proceeds to Step 103, where the status of a flag JF is detected. The flag JF indicates the in-focus status which is set in the "judgment" subroutine in Step 130, and the checking of the flag JF in Step 103 means checking the previous focus state. If the flag JF is 1, the lens was focused previously, the operation proceeds to Step 104, and returns the "AF control subroutine". In other words, in the one-shot mode, once the lens is focused, the new AF control is not effected until the switch SW1 is turned OFF and all the flags are cleared in Step 004. In the first "AF control" after turning ON of the switch SW1, since the flag JF has naturally been cleared, the operation proceeds to Step 108.

In Step 102, if the mode is the servo mode, the operation proceeds to Step 105.

In Step 105, the status of the flag RLS is detected. As described before, the RLS is a flag which is set in the "AE control" subroutine after the shutter release operation. In Step 105, if the flag RLS has been set to 1, it is judged that releasing has just been effected in the servo mode, i.e., the status is in the "AF continuous shooting", and the operation proceeds to Step 106.

In the case of the "AF continuous shooting", in Step 106 all the flags are first cleared, and after a flag FAF is set to 1 in the next Step 107, the operation proceeds to Step 129. In the servo mode, releasing can be effected at any time, it is possible that the operation proceeds to the releasing operation routine by interruption processing in any step of the program. In that case, all the flags are cleared in Step 106 so that the operation will not be affected by the processing which was executed immediately before branching to the release interruption. The flag FAF is a flag which recognizes the "AF continuous shooting" in the "AF control" subroutine.

In Step 105, if the flag RLS is set to 0, the operation proceeds to Step 108.

In Step 108, determination is made of the status of a flag PRMV. The PRMV flag is involved in the lens control, and is set to 1 when the lens is driven in the previous "AF control". Since a description is now being given of the first flow using the SW1, the flag PRMV is set to 0, and the operation proceeds to Step 112.

In Step 112, the status of a flag SRMV is detected. The flag SRMV is also involved in the lens control, and since the SRMV flag is now set to 0, the operation proceeds to Step 129.

Figure 4C:
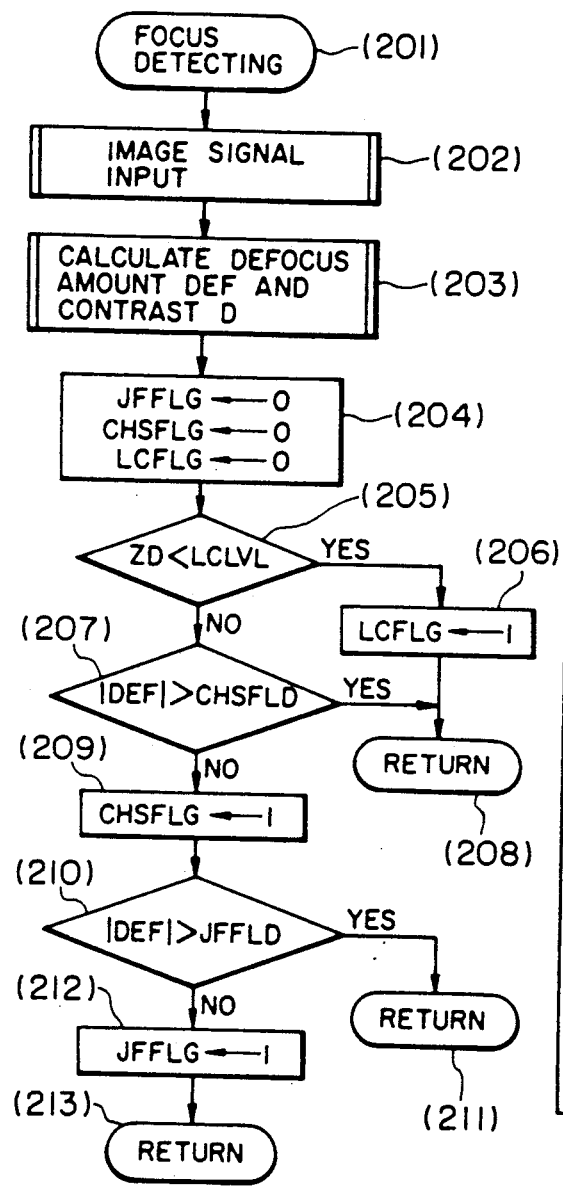

In Step 129, a "focus detection" subroutine is executed. The flowchart of this subroutine is shown in FIG. 4C, and the focus state of the photographic lens is detected in this subroutine.

Figure 4D:
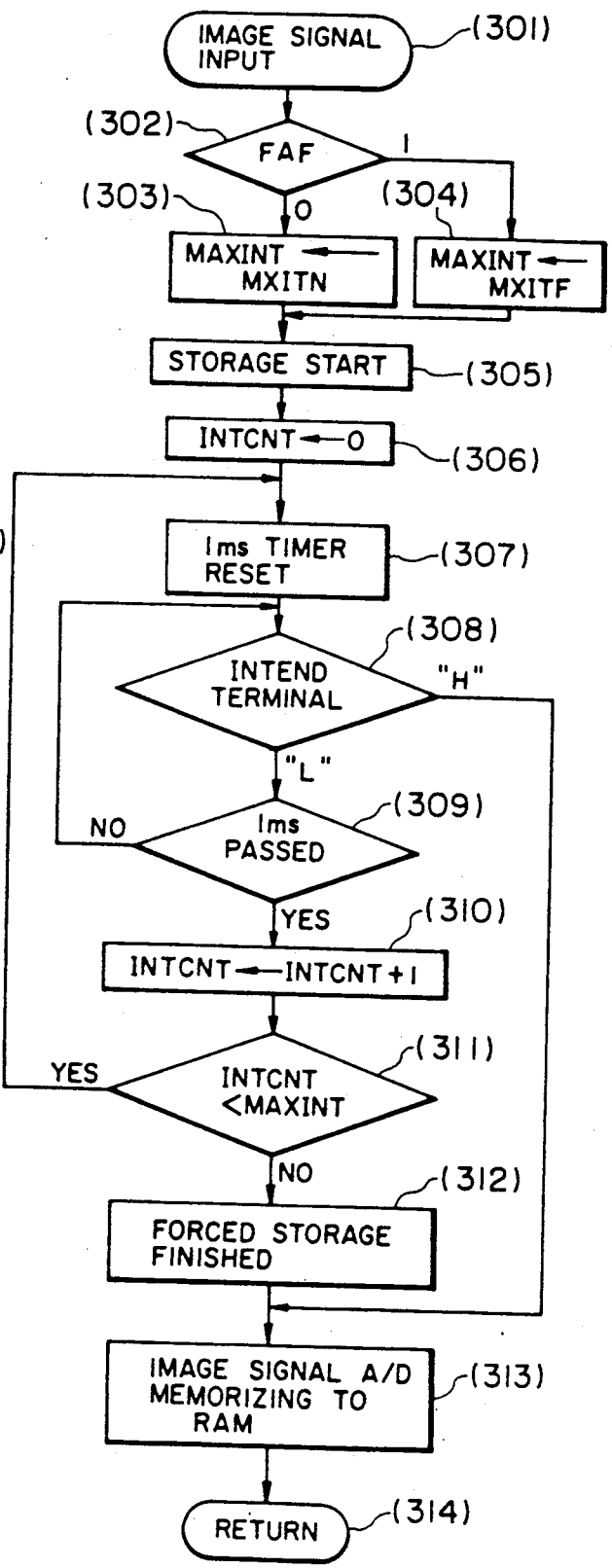
Figure 4E:
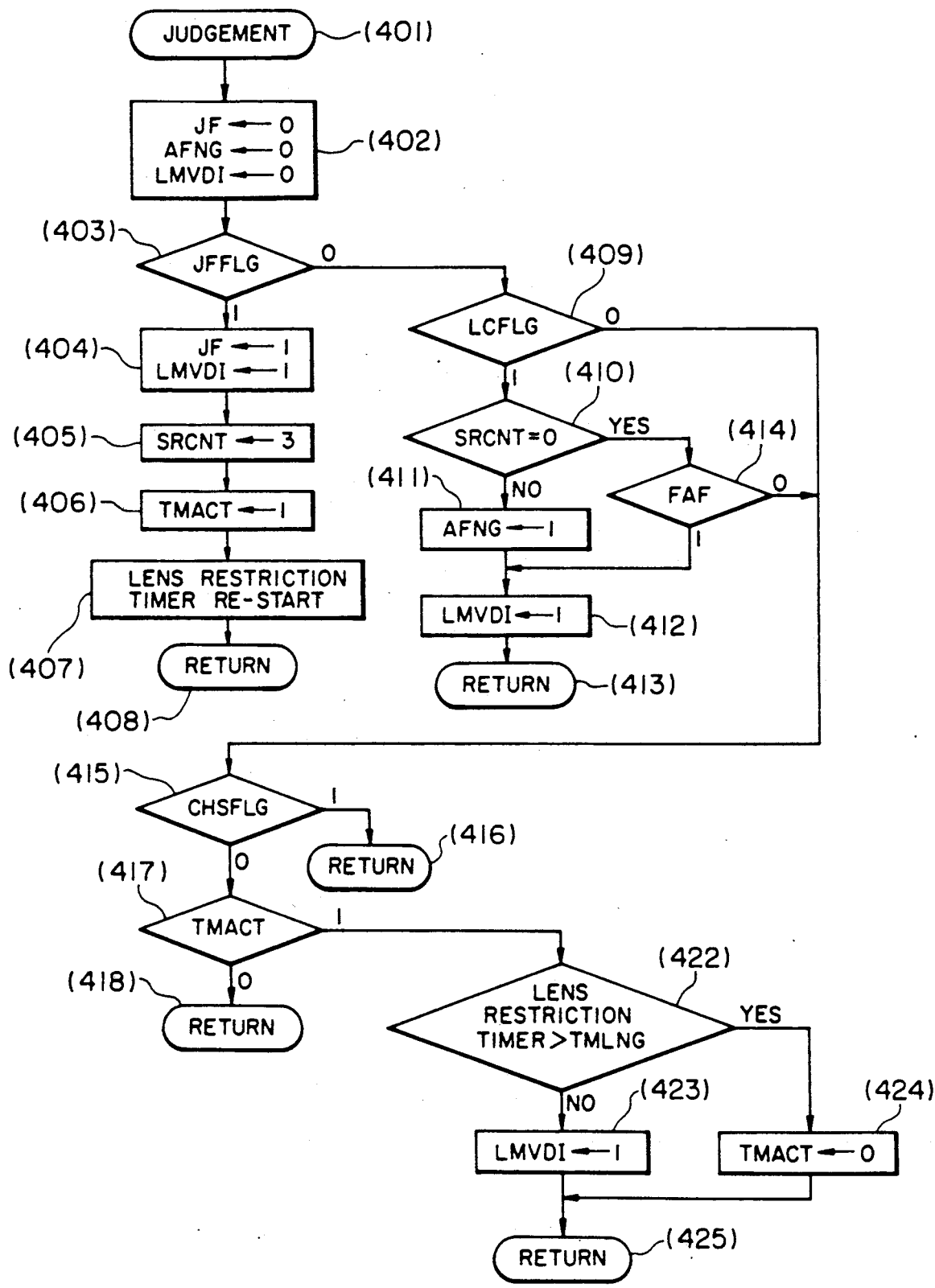

In the ensuing Step 130, a "judgment" subroutine is executed. The flowchart of this subroutine is shown in FIG. 4E. In this "judgement" subroutine, judgement is made of the in-focus state, the impossibility of detecting the focus, or the like on the basis of the result of the "focus detection" subroutine. If it is unnecessary to drive the lens any further, a lens drive prohibiting flag LMVDI is set to 1.

In the ensuing Step 131, a "display" subroutine is executed to display the in-focus state of the impossibility of focus detection. This is done by causing a display unit DSP to display by communicating with the display circuit DDR by supplying predetermined data thereto. Since this operation is not directly related to the present invention, a further description thereof will be omitted.

In Step 132, the status of the flag LMVDI is detected. As described earlier, if it is unnecessary to drive the lens, LKVDI is set to 1, so that if LMVDI=1 in Step 132, the operation proceeds to Step 133, where the "AF control" subroutine is returned. If the flag LMVDI is 0, the operation proceeds to Step 134, in which the status of a flag LCFLG is detected.

The LCFLG is a low-contrast flag which is set in the "focus detection" subroutine in Step 129, and is set to 1 when the contrast of an image signal is lower than a predetermined value. If the LCFLG is 0 in Step 134, it means that the contrast is sufficient for focus detection, so that after the "lens driving" which will be described later is effected in Step 135, a lens driving flag PRMV is set to 1 in Step 136, and the "AF control" subroutine is returned in Step 137.

If, the LCFLG is 1 in Step 134, judgment is made that the contrast is low, and the operation proceeds to Step 138.

The steps following Step 138 constitute the first control flow of the so-called "searching operation". In Step 138, communication is effected with the lens, and an amount of movement of the focussing lens is input from the in-lens control circuit in the form of a count FCNT of a "distance ring counter", which counts the aforementioned output pulses from the encoder ENC interlinked with the focussing lens. This counter is reset to 0 at the time of starting of the supply of the power source VL for the lens, and counts up the pulses when the lens is moving in the extending direction and counts down when it is moving in the retracting direction.

Accordingly, the relative position of the in-lens focussing lens in the direction of the optical axis can be determined from a count FCNT of the distance ring counter.

In the ensuing Step 139, the count FCNT is stored in a conversion area LPOS in the RAM provided in the microcomputer PRS. This count indicates the relative position of the lens when the searching operation is commenced. When it is impossible to detect an object with sufficient contrast in the searching operation, as will be described later, this count is used to return the lens to the search starting position of the lens.

In Step 140, an "instruction for driving in the far-near direction" is supplied to the lens, and is supplied to the circuit LPRS via the circuit LCM, as described above, thereby starting the searching operation. Upon receiving this instruction, the lens drives a focus adjusting lens in the near direction. Incidentally, at the time of giving an instruction for driving the lens in the near direction, the circuit LPRS sets LMF to "H" to drive the motor LMTR fowardly, thereby driving the lens in the near direction. Meanwhile, when an instruction for driving the lens in the infinity direction is given, the circuit LPRS sets LMR to "H" to drive the motor reversely, thereby driving the lens in the infinity direction. As for this instruction, an amount of drive is not indicated, and only the driving direction is indicated. When the focus adjusting lens reaches a mechanical limit at the near end, the in-lens control circuit LPRS detects the same so that the lens itself stops its drive. Incidentally, as for the detection of the position of the mechanical limit, in cases where the encoder pulse SENC is not generated for a predetermined time or more although a lens driving instruction has been issued, it is recognized that the focus adjusting lens has moved to the position of the limit, and the lens driving is therefore stopped. In Step 141, a variable SRCNT and the flag SRMV are set to 1. SRCNT is a variable which indicates the state of a searching operation and is set to 0 when the searching operation is not being effected, to 1 when the lens is being driven in the near direction, to 2 when it is being driven in the infinity direction, and to 3 when it is being driven in the search starting position of the lens. At this point, since the lens is moved in the near direction, the variable SRCNT is set to 1. The SRMV is a flag which indicates that the lens has been driven in the searching operation.

In Steps 138-141, the first control of the searching operation is carried out, and the "AF control" subroutine is returned to in Step 142.

In the first AF control subroutine after turning ON of the switch SW1, when the in-focus state has been obtained, the AF control is returned immediately without driving the lens in accordance with the in-focus state judged in Steps 129, 130. In addition, when an amount of defocus has been detected in the out-of-focus state, the lens is driven in the focussing direction in accordance with the defocus, and the AF control is then returned. On the other hand, when a judgement of low contrast is given, the lens is driven in the near direction, and after the searching operation is carried out, the AF control is returned.

Referring to FIG. 4 A, when the aforementioned "AF control" subroutine in Step 006 is completed, the status of the switch SW1 is judged again in Step 002. At this point, if the SW1 has been turned OFF, an instruction for stopping the drive is sent to the lens in Step 003. In other words, even if some instruction for driving the lens has been issued in the previous "AF control", if the switch SW1 is turned OFF, the lens driving is stopped. All the flags are then cleared in the ensuing Step 004.

If the switch SW1 remains turned ON in Step 002, after the "AE control" subroutine in Step 005 is executed, the execution of the "AE control" subroutine is commenced in Step 006.

The flow of the second and subsequent "AF control" subroutines with the switch SW1 turned ON will be described below with respect to different cases. First, a description will be given of a case where the lens is driven (the flag PRMV is set to 1) without low contrast (the flag LCFLG is set to 0) in the previous "AF control" subroutine, i.e., a case where the lens is driven in the focussing direction in the case of the out-of-focus state.

When the "AF control" subroutine is executed, judgement of the mode is made in Step 102. Judgment of the out-of-focus state has been made previously, so that the flag JF is set to 0. In addition, since the switch SW2 has not yet been turned ON and the shutter release operation has not been executed, the operation proceeds to Step 108 irrespective of the one-shot mode or the servo mode. In Step 108, judgment is made of the status of the flag PRMV, and the operation then proceeds to Step 109. In Step 109, the level of CLCM is set to "H" by the microcomputer PRS, the signal is supplied to the circuit LPRS via the circuit LCM, communication is carried out with the lens, and the information on the state of the lens driving is input from the in-lens control circuit LPRS. Namely, this control circuit counts pulses from the encoder ENC by the counter and the levels of the signals LMF, LMR are set to "L" when the count coincides with the number of pulses corresponding to the amount of defocus determined by the focus detection subroutine, thereby stopping the motor LMTRA and stopping the lens driving. When the control of the amount of lens driving corresponding to that amount of defocus has been completed, a lens stopping signal is formed internally. Thus, in Step 109, this lens stopping signal is input to the computer PRS by the aforementioned communication, and judgment is made as to whether or not the lens has completed the driving by the amount of defocus. At this point, the predetermined driving is completed, and if the lens is already stopped, the operation proceeds to Step 110, and after clearing the flag PRMV, the operation commences the new focussing operation in Step 129 and thereafter. If the lens has not yet stopped, the operation proceeds to Step 111 to return the "AF control" subroutine. In other words, a new focussing operation is not effected until the driving by an amount indicated to the lens is completed, and the new focussing operation is carried out for the first time in Step 129 and thereafter only after the lens driving is completed. In addition, when it is judged in Steps 129, 130 for the new focussing operation in Step 129 and thereafter that the lens has moved to the in-focus position and has assumed the in-focus state, the flags JF, LMVDI are set to 1, the AF control subroutine is returned, and the lens is maintained at the in-focus position. In addition, when the operation returns to Step 006 after the return of the AF control subroutine and the AF control subroutine is executed, in the case of the one-shot mode, 1 of the flag JF is detected in Step 103, so that, even if the AF control subroutine is repeated subsequently, the focus-detecting and judgment operations are not carried out, and the lens continues to be held at the in-focus position once obtained. In the case of the servo mode, meanwhile, each time the AF control is executed, the Steps 105, 108, 112, 129 and thereafter are repeated, so that the lens is moved to the in-focus position by following the movement of the object by the above-described operations. As described above, in the process in which the switch SW1 is held turned ON, Steps 005, 006 are repeated and the AF control subroutine is repeated, insofar as the judgment of low contrast is not made in the focus-detecting and judgment subroutines in each of the AF control subroutines, (1) "lens driving based on an amount of defocus at the time of detection of the out-of-focus state" and then (2) "detection and judgment of the focus state such as the detection of the amount of defocus after the lens driving, detection of the in-focus state, and detection of low contrast" are repeated. In the case of the one-shot mode, after judgment of the in-focus state is made in the repeated operations of the above processes (1) and (2) above, the repeated operations of the above processes (1) and (2) are stopped, and the lens is held in the in-focus position once obtained. In the case of the servo mode, on the other hand, the above processes (1) and (2) are repeated, and if the object moves and judgment of the out-of-focus state is made after the judgment of the in-focus state is made once, the lens is moved until the judgment of the in-focus state is made for the operation of the process (1) in the judgment of the process (2). Subsequently, this operation is repeated, and the lens is moved to the in-focus position by following the object.

Next, a description will be made of a case where a searching operation is carried out (the level of the flag SRMV is 1) due to the low contrast (the level of the flag LCFLG is 1) in the previous "AF control" subroutine.

If the "AF control" subroutine is executed again after the aforementioned searching operation is effected, the status of the flag SRMV is detected in Step 112, and the operation then proceeds to Step 113.

In Step 113, information of the status of the lens driving is input from the lens, and if the lens has already been stopped, the operation proceeds to Step 119. If the lens is being driven, the operation then proceeds to Step 114.

As described in Step 109, the control circuit LPRS forms a lens stopping signal when the lens is driven by an amount of defocus, but at the time of the lens driving in the near or infinity direction in a searching operation, information on an amount of defocus is not given to the lens. Meanwhile, if the lens has struck against the near limit or the infinity limit, as described above, pulses from the encoder ENC are not generated although an instruction for the lens driving is issued. Even if this status is generated, the lens stopping signal is formed in the control circuit LPRS. According, in Step 113, this lens stopping signal is detected in the same manner as in Step 109, and the braching into Steps 119 and 114 is effected.

As described above, the searching operation controls the following operations;
(1) The lens is driven in the near direction (variable SRCNT=1).
(2) If an object with contrast cannot be found during the driving in the above process (1) and the focus adjusting lens reaches the near-side mechanical limit, the lens is driven in the infinity direction (variable SRCNT=2).
(3) If an object with contrast cannot be found during the driving in the above process (2) and the focus adjusting lens reaches the infinity-side mechanical limit, the lens is driven to the search-starting position (variable SRNCT=3).

When the lens is being driven, the "focus detection" subroutine is executed in Step 114. In this subroutine, an amount of defocus and contrast of the object is detected. In Step 115, the status of the low-contrast flag LCFLG is judged, and if the level of the LCFLG is 1 and thus represents low contrast, the "AF control" subroutine is returned in Step 117. In other words, the focus is detected during the lens driving in the searching operation, and if the low contrast is detected in that status, the lens is continued without proceeding to other steps. Meanwhile, at this point, if the level of the flag LCFLG is 0 and judgment is made that low contrast is not detected, the operation proceeds to Step 116, and a "lens stop instruction" is issued to the lens and sets the levels of LMR, LMF to "L", thereby stopping the lens driving. Subsequently, after the flag SRMV is cleared in Step 118, new focussing control is effected in Step 129. In other words, if low contrast is not detected in the focus detection during the searching operation, i.e., if a contrast sufficient for focus detection is detected, the lens driving is stopped, and the searching operation is completed (SRMV is set to 0). The new focus adjustment in the forementioned Step 129 and thereafter is carried out, and the lens is moved to the in-focus position by the above-described operation.

If the contrast cannot be detected when the lens is driven in the near direction in the aforementioned procedure (1), the "AF control" subroutine is returned in Step 117 each time the "AF control" subroutine is executed until the focus adjusting lens of the lens reaches the near-side mechanical stop.

If the lens driving in the near direction is continued without a sufficient contrast being detected in the above-described procedure and if the lens reaches the near limit, the lens stop is detected in Step 113, and the operation proceeds to Step 119. Sine a description is being given of the aforementioned case (1), the operation proceeds to Step 120. Incidentally, in the case of (2), the operation proceeds from Step 119 to Step 123, and the operation proceeds to Step 124 in this case. In the case of (3), the operation proceeds to Step 118 at this point, and completes the searching operation. In the cases of (2) and (3), however, a description will be given later. In Step 120, 1 is added to the variable SRCNT. This is because, since the lens has reached the near limit, the lens is then driven in the infinity direction. In the ensuing Step 121, an "instruction for driving in the infinity direction" is sent to the lens, and the driving instruction is given to the lens in the same way as that for the driving in the near direction, and the lens is thus driven in the infinity direction, thereby starting the above-described searching operation (2). Subsequently, the "AF control" subroutine is returned to in Step 122. Steps 13, 115 are repeatedly executed during the operation of (2) until the lens reaches the infinity end. As for control in cases where the contrast cannot be obtained, the return is effected in Step 117 each time the "AF control" subroutine is executed, in the same way as that for the procedure (1) described before. Also, in cases where the contrast is detected during driving to the infinity end, Steps 116, 118 are executed in the same way as that for the procedure (1). After that point, the lens is moved to the in-focus position by the aforementioned Step 129 and thereafter.

In addition, if a low contrast state is maintained through the procedure (2) and the focus adjusting lens of the lens reaches the mechanical limit on the infinity side, the lens stop is detected in Step 113, and the operation proceeds to Step 123 via Step 119. Since the searching operation is now performing the procedure (2), SRCNT is 2, and the operation proceeds to Step 124 from Step 123. In Step 124, 1 is added to the variable SRCNT to make SRCNT equal 3, thereby initiating the procedure (3) in the searching operation.

In Step 125, the above-described distance ring counter value FCNT is input, the value of LPOS minus FCNT is stored in the variable FP. A value of the distance ring counter indicating the lens position when the searching operation was effected is stored in he variable LPOS, while FCNT in Step 125 is the current value of the counter which indicates the lens position at the time when the operation o the procedure (2) is completed. FP in which the value of the current counter is subtracted from LPOS indicates a value of the distance ring counter from the current lens position to a search starting position. This FP is output to the lens control and driving circuit LPOS in Step 127 in the same manner as that of the above-described communication, and the lens driving in the amount of FP in terms of the value of the distance ring counter is thereby issued. The circuit LPOS detects an amount of movement of the lens by pulses sent from the encoder ENC on the basis of said FP, in the same way as the normal control of the lens driving on the basis of an amount of defocus, and drives the lens by the portion of said FP to move the lens to the search starting position. In Step 128, the "AF control" subroutine is then returned to. Control of the searching operation (3) during the lens driving on the basis of FP is similar to the cases of (1) and (2) described above. Namely, if a sufficient contrast is detected during an approach to the search starting position, the lens is stopped at that point, and the normal focussing operation is commenced in Step 129 and thereafter. If judgment is not made of a sufficient contrast during the operation (3), and if the focus adjusting lens reaches the search starting position, the lens stop is detected in Step 113, and the operation goes through Steps 119, 123, and after completing the searching operation by clearing the flag SRMV in Step 118, the new focussing operation is commenced in Step 129 and thereafter.

Next, a description will be given of the "AF continuous shooting" in which the switch SW2 remains turned ON with the AF mode in the servo mode. In this case, the release flag RLS is set to 1 in the "AF control" subroutine, as described before. Accordingly, in the "AF control" subroutine which is effected after exposure has been carried out in a shutter release operation, the status of the flag RLS is detected in Step 105, and the operation proceeds to Step 106. In Step 106, all the flags are cleared, all the statuses concerning the past "AF control" are initialized, and an AF continuous shooting flag FAF is set to 1 in the ensuing Step 107. Subsequently, the operation proceeds to Step 129 so as to execute a focussing operation. At the time of the AF continuous shooting, the discrimination of the statuses of the flags PRMV and SRMV concerning the lens driving and the searching operation is not carried out. The reason for this and the lens driving peculiar to the AF continuous shooting will be described in detail in the "lens driving" subroutine.

The flow of the "AF control" subroutine described above is summarized as follows: If an "AF control" subroutine from a main routine of the camera is executed, the focus detection is carried out. If the low contrast is not obtained as its result, the lens driving based on an amount of defocus is effected, and the new focussing operation is not carried out until the lens completes a predetermined amount of driving. In case of the low contrast, the searching operation is started, and the lens is first driven in the near direction, and the focus detection is effected during the lens driving. If the object is detected as having a contrast, the lens driving is stopped at that point, and the focussing operation is carried out anew in the stopped state. If the contrast cannot be detected and the lens reaches the near end, the lens is then driven in the infinity direction. If it reaches the infinity end, the lens is then driven in the search starting position. If the contrast is detected in the mean time, the lens is stopped, and a new focussing operation is effected, and if the lens reaches the search position without being above to detect the contrast, the searching operation is completed at that point.

FIG. 4C shows a flowchart of a "focus detection" subroutine.

In Step 202, an "image input signal" subroutine is executed, and an image signal from the sensor SNS is stored in a predetermined area in the microcomputer. The flowchart of the "image signal input" subroutine is shown in FIG. 4D, which will be described later.

Subsequently in Step 203, a defocus amount DEF of the photographic lens and a contrast ZD are calculated from already stored image signals. Since a specific method is disclosed by the present applicant in Japanese Patent Application No. 160824/1986, a detailed description thereof will be omitted.

In Step 204, three flags JFFLG, CHSFLG, and LCFLG are cleared. In Step 205, the contrast amount ZD and a predetermined amount LCLVL are compared, and if ZD<LCLVL, the operation proceeds to Step 206, and the flag LCFLG is set to 1. In other words, if the contrast amount ZD is smaller than the predetermined amount LCLVL, a low contrast flag LCFLG is set to 1. In Step 208, the "focus detection" subroutine is returned to. If ZD≧LCLVL in Step 205, the operation proceeds to Step 207, and a comparison is made between an absolute amount of the defocus amount DEF and a predetermined amount CHSFLD. If |DEF|>CHSFLD, the operation proceeds to Step 208, in which the "focus detection" subroutine is returned to.

If |DEF|≦CHSFLD in Step 207, the flag CHSFLG is set to 1 in Step 209. In other words, if there is a sufficient contrast and if the defocus amount falls within a range close to the in-focus position indicated by CHSFLD, the close-to-in-focus position flag CHSFLG is set to 1.

In Step 210, |DEF| is compared with a predetermined amount JFFLD (JFFLD<CHSFLD), and if |DEF|>JFSFLD, the operation proceeds to Step 211, in which the "focus detection" subroutine is returned to. On the other hand, if |DEF|≦JFSFLD, the flag JFFLG is set to 1 in Step 212, and the "focus detection" subroutine is returned to in Step 213. Namely, if the defocus amount is within a focus range indicated by JFFLD, the in-focus area flag JFFLG is set to 1.

As described above, in the "focus detection" subroutine, the defocus amount and the contrast of the photographic lens are detected, and in the case of low contrast, the low contrast flag LCFLG is set to 1, while if there is a sufficient contrast, it is cleared to 0. Furthermore, if the defocus amount is in the vicinity of the in-focus position, the flag CHSFLG is set to 1, and if it is in the in-focus area, the flag JFFLG is set to 1, followed by a return.

FIG. 4D shows a flowchart of the "image signal input" subroutine.

If the "image signal input" subroutine is executed, the status of the AF continuous shooting flag FAF is discriminated in Step 302. If the FAF is 1, a predetermined value MXITF is stored in a variable MAXINT, while if it is 0, a predetermined value MXITN is stored in the MAXINT. The MAXINT is a variable which defines a maximum storage time of the sensor in millimeter units, and there is a relationship of MXITN>MXITF. Accordingly, the maximum storage time is set such as to be shorter at the time of the AF continuous shooting.

In the ensuing Step 305, the accumulation of a light image in the sensor SNS is started. Specifically, the microcomputer PRS sends a "storage starting command" to the sensor driving circuit SDR, which in turn sets the level of a clear signal CLR of a photoelectric conversion element section of the sensor SNS to "L" to commence the accumulation of electricity.

In Step 306, a storage time counter INTCNT set in the RAM is initialized to 0. In Step 307, a 1 ms time is reset, and the operation is started with the counting operation reset. Incidentally, the timer function of the microcomputer PRS is used as the 1 ms timer.

In Step 308, the input INTEND terminal of the PRS is detected in Step 308, in which whether or not the storage has been completed is checked. The sensor driving circuit SDR sets the level of the signal INTEND to "L" simultaneously with the starting of the storage, and monitors an AGC signal from the SNS. If the AGC reaches a predetermined level, the sensor driving circuit SDR sets the signal INTEND to "H", and simultaneously sets a charge transmission signal SH to "H" for a predetermined time. Thus, the sensor driving circuit SDR has a structure for transmitting charges of the photoelectric conversion element section to the CCD section.

If the INTEND terminal is "H" in Step 308, the operation proceeds to Step 313 since the storage is completed. If it is "L", the operation proceeds to Step 309 since the storage has not been completed. If the operation has not been completed, determination is made in Step 309 whether or not the 1 ms timer which was reset earlier has counted 1 ms. Unless the 1 ms has not elapsed, the operation proceeds to Step 308, the operation waits for the completion of the storage or an elapse of 1 ms. If 1 ms elapses before the completion of the storage, the operation proceeds to Step 310. In Step 310, the storage time counter INTCNT is counted up by 1, and the operation then proceeds to Step 311. In Step 311, the counter INTCNT is compared with the variable MAXINT, which represents the maximum storage time expressed in milliseconds, as described above. If INTCNT is less than MAXINT, the operation returns to Step 307 and waits again for the completion of storage. If INTCNT coincides with MAXINT, the operation proceeds to Step 312, and forcedly terminates the storage. The forced termination of storage is executed by sending a "storage completion command" from the microcomputer PRS to the sensor driving circuit SDR. When the "storage completion command" is sent from the PRS to the SDR, the SDR sets the charge transmission signal SH to "H" for a predetermined time and transmits the charges of the photoelectric conversion section to the CCD section. The storage of a light image in the sensor is completed in the flow up to Step 312. In other words, when the storage is completed within the maximum time MAXINT from the storage start in the aforementioned Steps 305 to 311, the operation proceeds to Step 313 at that juncture. Meanwhile, when the storage is not completed within the aforementioned time duration, the storage operation is forcedly terminated with the lapse of this time, and the operation proceeds to Step 313.

In Step 313, a signal AOS obtained by amplifying an image signal of the sensor SNS by the sensor driving circuit SDR is subjected to A/D conversion, and a digital signal thereof is stored in the RAM. To give a more detailed description, the SDR generates CCD driving clock pulses $\phi1$, $\phi2$ in synchronization with the clock CK from the PRS and supplies the same to the control circuit SSCNT in the SNS. The CCD section of the SNS is driven by $\phi1$, $\phi2$, and charges in the CCD are output from the output OS as image signals in a time series. After being amplified by the amplifier in the SDR, these signals are input to the analog input terminal of the PRS as AOS. The PRS effects A/D conversion in synchronization with the clock signal CK which it is outputting. Digital image signals after A/D conversion are stored consecutively in predetermined addresses in the RAM. If the input of image signals is thus completed, the "image signal input" subroutine is returned to in Step 314. FIG. 4E shows a flowchart of a "judgment" subroutine.

In Step 402, three flags JF, AFNG, and LMVDI are cleared. The flag JF indicates the in-focus state; the flag AFNG indicates that the focus detection is impossible; the flag LMVDI inhibits the lens driving.

In Step 403, discrimination of the status of the in-focus-area flag JFFLG which is set in the "focus detection" subroutine is executed. If the result is 1, it is judged that the status is that of in-focus, and the operation proceeds to Step 404 in which the control of the in-focus state is effected. In this Step 404, both the in-focus flag JF and the lens driving inhibiting flag LMVDI are set to 1. In the ensuing Step 405, the constant SRCNT is set to 3. SRCNT is a variable which indicates the status of a searching operation, as described before, and "SPCNT=3" means that the searching operation has been completed. In other words, if the in-focus state is obtained, the situation becomes the same as that of the completion of the searching operation. In the ensuing Step 406, a flag TMACT is set to 1. The flag TMACT indicates that a lens driving restriction timer, which will be described later, is in operation. In Step 407, that timer is started, and the "judgment" subroutine is returned to in Step 407. The lens driving restriction timer utilizes the internal timer of the microcomputer PRS, and starts counting from the point of a restart and is capable of arbitrarily reading its contents.

In Step 403, if the in-focus-area flag JFFLG is 0, the operation proceeds to Step 409, in which discrimination is made of the status of the low-contrast flag LCFLG which is set in the "focus detection" subroutine. If the flag LCFLG is 1 in Step 409, it is judged that the result of focus detection was low contrast, and the operation therefore proceeds to Step 410.

In Step 410, the status of the searching operation status variable SRCNT is detected, and if the answer is not 0, the operation proceeds to Step 411. The fact that the variable SRCNT is not 0 means that a searching operation has been carried out after the switch SW1 was turned ON, or that such a setting was forcedly made because the in-focus state was obtained. In this case, to ensure that a searching operation will not be carried out again, the focus-detection-impossible flag AFNG is set to 1 in Step 411, and the lens drive inhibiting flag LMVDI is set to 1 in the ensuing Step 412. If the flag LMVDI is 1, the operation proceeds to Step 133 in Step 132 in the "AF control" subroutine in FIG. 4B to return the "AF control", so that the searching operation in Step 138 and thereafter is not carried out.

If the variable SRCNT is 0 in Step 410, the operation proceeds to Step 414 to detect the status of the continuous AF flag FAF.

If the flag FAF is 1 in Step 414, i.e., if the status is continuous shooting AF, the operation proceeds to Step 412, and the flag LMVDI is set to 1 to ensure that a searching operation will not be effected. When the flag FAF is 0, the operation proceeds to Step 415, in which case the operation of the "AF control" subroutine is executed.

Namely, the above-described searching operation is executed when the judgment of a low contrast is made in the focus detection subroutine in Step 129 in the AF control subroutine and the flag LCFLG is set to 1. However, when 1 of the flag LMVDI was detected in the immediately preceding Step 132, the operation does not proceed to the searching operation in Step 138 and thereafter, and the searching operation is not effected even if the judgment is made of the low contrast in Step 129.

In addition, even if judgment is made that the contrast is low in the focus detection subroutine in Step 129, if it is judged in Step 410 in the judgment subroutine that SRCNT$\neq$0, and when, even if SRCNT=0, it is judged in Step 414 that the mode is the AF continuous shooting, the flag LMVDI is set to 1 in Step 412. In such a situation, even if judgment is made of the low contrast in Step 129, the searching operation is not carried out.

In addition, since SRCNT $\neq$0 if a searching operation has been performed previously, if a searching operation was performed previously and judgment was made of the low contrast by the execution of the subsequent AF control subroutine, the operation proceeds to Step 132 and then to Step 133 to return the AF control subroutine. Accordingly, the above-described searching operation is carried out only once.

In addition, even if judgment is made once of the in-focus state in the judgment subroutine, as described above, SRCNT=3, so that the searching operation is not carried out even if judgment of the low contrast is made in Step 129 during execution of the subsequent AF control subroutine. Furthermore, in the case of AF continuous shooting, the searching operation is not effected even if judgment of the low contrast is made in Step 129, and the searching operation is carried out during an AF continuous shooting, thereby preventing the shutter release opportunity from being lost.

Accordingly, as long as the switch SW1 is held turned ON, the searching operation is effected once only when judgment of the in-focus state was not made previously, when the mode is not the AF continuous shooting, and when judgment of the low contrast has been made for the first time. Thus, insofar as the switch SW1 is held turned ON, the subsequent searching operation is inhibited.

In addition, if the low-contrast flag is 0 in Step 409 of the judgment subroutine, i.e., if there is a sufficient contrast, the operation proceeds to Step 415.

In Step 415, if the close-to-in-focus-position flag CHFLG is 1, the operation proceeds to Step 416 to return the "judgment subroutine. If the flag CHSFLG is 0 in Step 415, it is judged that the amount of defocus is not in the vicinity of the in-focus position, and the operation therefore proceeds to Step 417.

In Step 417, the status of a lens drive restriction timer operating flag TMACT is determined, and if the result is 0, indicating that the timer is not operating, the operation proceeds to Step 416 to return to the "judgment" subroutine. If TMACT is 1, indicating that the timer is operating, the operation proceeds to Step 422, and the subsequent control of the lens drive restriction timer is carried out.

TMLNG is a constant for restricting the operating time of the lens drive restricting timer. The lens drive restricting timer, which has started counting due to the fact that the in-focus state has been obtained, inhibits the lens driving if the value of the timer is less than the aforementioned TMLNG, and permits the lens driving if the value of the timer exceeds the TMLNG.

In Step 422, a comparison is made between the value of the lens drive restriction timer which is counting and the predetermined constant TMLNG. If the former is greater, the operation proceeds to Step 424, the lens drive restriction timer operating flag TMACT is cleared, and the "judgment" subroutine is returned to in Step 424. If the latter is greater in Step 422, the operation proceeds to Step 423, in which the lens drive inhibiting flag is set to 1, and the "judgment" subroutine is returned to in Step 425.

In cases where there is no low contrast and the focussing state is that in the vicinity of the in-focus position, after the judgment subroutine is executed, the lens is driven in the direction of the in-focus position in Step 135 through Steps 131, 132, and 134. Meanwhile, when the focussing state is not that in the vicinity of the in-focus position, the lens driving in Step 135 is inhibited in Steps 132, 133 after the in-focus state is once obtained and until a predetermined time elapses, and the lens driving is executed on the basis of an amount of defocus in Step 135 after the lapse of the predetermined time.

The flow of the "judgment" subroutine described above, including the entire operation, can be summarized as follows:

In the repeated operation of the AE control subroutine and the AF control subroutine with the switch SW1 set in the ON state, if the amount of defocus is greater than a range which is considered to be in the in-focus state in the result of the focus detection, the lens is driven on the basis of the amount of defocus, and upon completion of the lens driving on the basis of the amount of defocus, the operations of focus detection and judgment are carried out again. If judgment of the in-focus state is not made in this state, the lens driving on the basis of the detected amount of defocus as well as focus detection and judgment are executed again until the judgment of the in-focus state is made. If the judgment of the in-focus state is made, the in-focus-state flag JF is set to 1, and the lens drive inhibiting flag LMVDI is set to 1. While the switch SW1 is set in the ON status, it is ensured that the searching operation is not performed even if the contrast is low, and, at the same time, the lens drive restriction timer is operated. If the mode is set in the one-shot mode in this state, the focus detection and judgment as well as the lens driving are not effected at all in the subsequent AF control subroutine, and the lens is held in the once-focussed state.

In addition, in the servo mode, each time the AF control subroutine is executed even after the in-focus state has been obtained, the above-described focus detection and judgment as well as the lens driving operation are executed, and the lens always moves to the in-focus state by following the movement of the object to be photographed.

When it is judged in the above-described AF control subroutine that the contrast is low, the aforementioned searching operation is executed. However, even if the contrast is judged to be low, in cases where the switch SW1 is turned ON and a judgment of the in-focus state is made even once in the subsequent AF control subroutine, LMVDI is set to 1 in order to ensure that the operation will not be carried out if the contrast is judged to be low. In addition, when a searching operation is similarly carried out even once, LMVDI is set so that, even if the contrast is subsequently judged to be low, the searching operation will not be performed. In addition, LMVDI is similarly set to 1 so as to inhibit the searching operation during the continuous shooting AF.

Accordingly, the searching operation is executed only once when the mode is not the continuous shooting AF and it is judged that the contrast is low without the judgment of the in-focus state having been previously made in the process in which the AF control subroutine is repeated.

Although the lens is driven immediately in the repeated operations of focus detection and judgment and lens driving, when the amount of defocus detected is above a predetermined value, while the lens drive restriction timer is being operated after the in-focus state has been obtained previously, i.e., when a fixed time duration has not elapsed after focussing, the lens is driven after waiting for this time duration to elapse.

In the case of the lens driving at the time of a searching operation, the lens is driven immediately.

As for the image signal storage time during a focus detection operation, the maximum storage time during the continuous shooting AF is set to be shorter than in the case of the normal AF, thereby shortening the AF operation time as practically as possible and shortening pauses between shutter release operations.

Figure 4F:
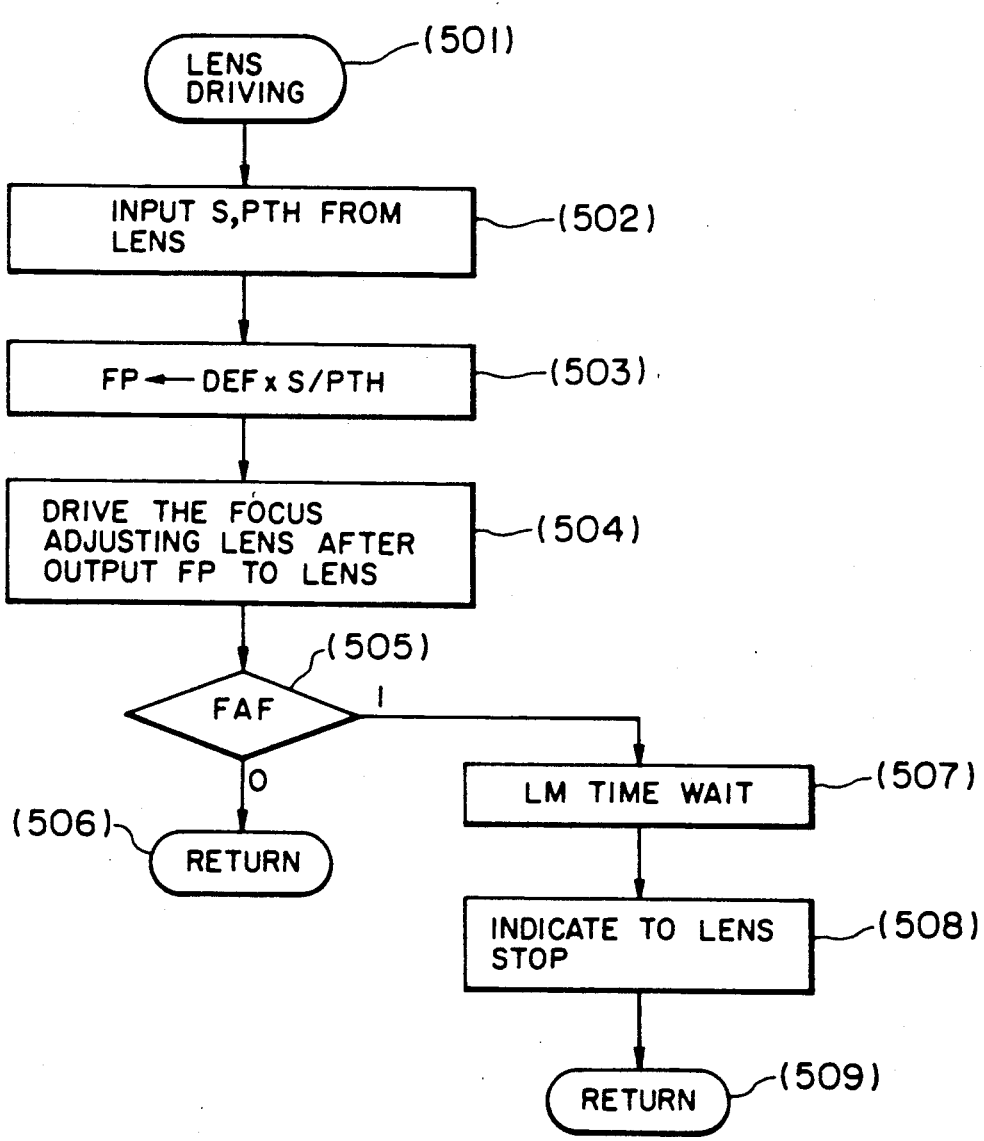

FIG. 4F shows a flowchart of the "lens driving" subroutine.

When this subroutine is executed, communication with the lens is performed in Step 502, and two data "S" and "PTH" are input. "S" represents a "coefficient of a defocus amount to a focus-adjusting-lens extending amount" which is peculiar to a photographic lens. For instance, in the case of a single lens of a type in which the entire lens unit is extended, since the entire photographic lens is the focus adjusting lens, $S = 1$, whereas, in the case of a zoom lens, S varies depending on each zooming position. "PTH" represents an amount of extension of the focus adjusting lens per pulse of an output of the encoder which is interlinked with the movement of the focus adjusting lens LNS in the direction of the optical axis. Incidentally, these data are stored in the memory of the circuit LPRS and are input to the microcomputer PRS through communication between the microcomputer and the circuit LPRS.

Accordingly, a lens driving amount FP, i.e., a value in which an amount of extension of the focus adjusting lens is converted to a number of pulses output from the encoder on the basis of the present defocus amount DEF, S, and PTH of the photographic lens, is given by the following formula:

$$FP = DEF \times S/PTH$$

In Step 503, the above formula is executed as it is.

In Step 504, the FP determined in Step 503 is sent to the lens and instructs the focus adjusting lens (the overall photographic lens in the case of the single lens of the type in which the entire lens unit is extended) to be driven.

Subsequently, in Step 505, the status of the continuous shooting AF flag FAF is detected. If the flag FAF is 0, it is judged that the normal focussing is being carried out, so that the operation proceeds to Step 506 to return the "lens driving" subroutine.

If the FAF is 1 in Step 505, i.e., in the case of the continuous shooting AF, the lens control peculiar to the continuous shooting AF is executed in Steps 507 and 508.

In Step 507, the operation waits for a predetermined time LM, which corresponds to a driving time (fixed) of the lens driving instructed in Step 504. After a lapse of this time, in Step 509, the "lens driving" subroutine is returned. In the continuous shooting AF, the "AE control" and the "AF control" are carried out alternately, as described before, and a series of release operations (film exposure and wind-up) is executed by interruption processing by the switch SW2. Accordingly, since the shutter release operation is effected immediately upon completion of the "AF control" subroutine, there is no time for the lens driving. For this reason, time for the AF continuous shooting is created, and during the continuous shooting AF the lens driving is performed only during the time LM, and if the AF control subroutine is then returned to the shutter release operation is effected immediately. Accordingly, in the AF continuous shooting mode, the lens driving time is always set to LM.

To give a further description, since the searching operation is not carried out during continuous shooting and the lens driving is completed within the "AF control" subroutine, there is no need to discriminate the statuses of the flags PRMV, SRMU involved in the lens driving in the above-described main routine.

In addition, when the amount of defocus is large, the time LM is set to be shorter than the time required in driving the lens by that amount of defocus. Hence, in this case, although an in-focus state cannot be always obtained, the photographing intervals can be shortened so as to suit the purposes of continuous shooting.

In the embodiment of this invention, although an arrangement is such that a photographing operation and a focussing operation ar performed y one microcomputer, it is evident that the advantages of the present invention can be obtained even if these operations are independently carried out by two microcomputers, respectively.

It should be noted that, although the "AF control" is performed only once during continuous shooting, this control should no be confined to one time, but may be effected two or three times. In this case, although the photographing intervals become longer, the accuracy in focussing can be improved.

In addition, although in the foregoing embodiment the operation simply waits for a time in terms of the lens driving time in Step 507 in the "lens driving" subroutine, it is more effective, as another method, to provide an arrangement in which the status of the lens driving is detected in advance, and when the lens has stopped earlier than a predetermined time, the "AF control" subroutine is returned at that point.

Moreover, as for the recognition of the state of continuous shooting, the switch SW2 may be actually detected instead of the flag RLS.

Although the driving time LM during continuous shooting is assumed to be fixed, this time LM may be adjusted in accordance with the focal length of the lens.

As has been described above, in accordance with the present invention since restrictions can be imposed on the frequency of the focussing operation, lens driving time, or an image storage time with respect to the focussing operation which is performed during each shot in continuous shooting, the focussing operation time can be reduced, so that it is possible to provide a camera having an auto-focussing device which is suitable for continuous shooting.

I claim:

1. A camera having a first mode for effecting a single shutter release operation each time a release member is operated and a second mode for effecting said shutter release operation repeatedly for each shot while said release member is set in a certain operating state, said camera comprising:
   a) a focus detecting circuit adapted to detect the focusing state of an image-forming optical system and to output a focus signal;
   b) a drive circuit for driving said image-forming optical system in a direction toward an in-focus state on the basis of said focus signal from said focus detection circuit;
   c) a control circuit which, in said first mode, repeatedly executes said operation of detecting said focusing state and said operation of driven said image-forming optical system until said shutter release operation is performed, and which, in said second mode, performs a predetermined number of cycles of said operation of detecting said focusing state and said operation of driving said image-forming optical system before executing said shutter release operation; and
   d) a restriction circuit for restricting a driving time of said image-forming optical system, said restriction circuit being operable in said second mode while being prohibited from operating in said first mode.

2. A camera according to claim 1, wherein said restriction circuit restricts a maximum time for driving said image-forming optical system to a predetermined time.

3. A camera according to claim 1, wherein, in said second mode, said restriction circuit executes for a predetermined time, said operation of driving, said image-forming optical system on the basis of said focus signal from said focus detecting circuit before said shutter release operation is performed.

4. A camera according to claim 1, wherein said predetermined number of cycles is one cycle.

5. A camera according to claim 1, wherein said predetermined number of cycles is one cycle.

6. A camera having a first mode for effecting a single shutter release operation each time a release member is operated and a second mode for effecting said shutter release operation repeatedly for each shot while said release member is set in a certain operating state, said camera comprising:
   (a) an accumulation-type sensor for receiving an light from an object to be photographed which is made incident via an image-forming optical system, said sensor accumulating an image signal corresponding to said image of said object to be photographed;

(b) a drive circuit for driving said image-forming optical system on the basis of said image signal accumulated in said sensor for a predetermined time in such a manner that an in-focus state is obtained;

(c) a storage time control circuit for controlling said predetermined time for storing said image signal in said accumulation-type sensor in such a manner that the level of said image signal reaches a predetermined value; and (d) a restriction circuit which limits said storage time restricted by said storage time control circuit, said restriction circuit being adapted, in said first mode, to inhibit said storage time controlled by said storage time control circuit from exceeding a first time and, in said second mode, to inhibit the same from exceeding a second time which is shorter than said first time.

7. A camera having a shutter release member, an imaging optical system, a focus detecting circuit for detecting the focus state of the optical system, and a driving circuit for driving the optical system to place it in focus, the shutter release member having (1) a first state wherein the focus detecting circuit and the driving circuit repeatedly detect the focus state of the optical system and drive it, and (2) a second state wherein a shutter releasing operation is repeatedly performed and the focus detecting circuit and the driving circuit detect the focus state and drive the optical system a predetermined number of times before the shutter releasing operation, comprising:

a restriction circuit for restricting an operation time of the driving of the optical system by the driving circuit to a predetermined, time, said restriction circuit forcibly terminating the driving of said optical system when the driving of said optical system by an amount corresponding to the focus state detected by said detecting circuit is not completed during the predetermined time.

8. A camera according to claim 7 wherein said restriction circuit comprises a time which causes the driving circuit to drive the optical system during the predetermined time period after completion of the detecting operation by the focus detecting circuit.

9. A camera according to claim 7 wherein said driving circuit drives the optical system by an amount corresponding to a detection result of said focus detection circuit.

10. Apparatus for use in a camera having a shutter release member, an imaging optical system, a focus detecting circuit for detecting the focus state of the optical system, and a diving circuit for driving the optical system to place it in focus, the shutter release member having (1) a first state wherein the focus detecting circuit and the driving circuit repeatedly detect the focus state of the optical system and drive it, and (2) a second state wherein a shutter releasing operation is repeatedly performed and the focus detecting circuit and the driving circuit detect the focus state and drive the optical system a predetermined number of times before the shutter releasing operation, comprising:

a restriction circuit for restricting a time period of the detecting operation by the focus detection circuit; and a control circuit for controlling the time period restricted by said restriction circuit at the second shutter release member state to be shorter than in the first shutter release member state.

11. Apparatus according to claim 10 wherein the focus detecting circuit performs the focus detection operation based on a signal accumulated in an accumulation sensor receiving light from an object, and wherein said restriction circuit restricts the accumulation time of the accumulation sensor.

12. A camera according to claim 11 wherein the restriction circuit restricts a maximum accumulation time of the sensor, and, in said second state, said focus detecting circuit and said driving circuit perform one operation of focus detection and one operation of optical system driving before the shutter release operation.

13. Apparatus for sue in a camera having a shutter release member, an imaging optical system, a focus detecting circuit for detecting the focus state of the optical system, and a driving circuit for driving the optical system to place it in focus, the shutter release member having (1) a first state wherein the focus detecting circuit and the driving circuit repeatedly detect the focus state of the optical system and drive it, and (2) a second state wherein a shutter releasing operation is repeatedly performed and the focus detecting circuit and the driving circuit detect the focus state and drive the optical system a predetermined number of times before the shutter releasing operation, comprising:

a control circuit for restricting the focus detection operation of the focus detection circuit to one time before execution of each shutter releasing operation when the shutter release member is in the second state, and for controlling the driving operation of the driving circuit for a predetermined time period when the shutter release member is in the second state, said control circuit prohibiting the restriction of the driving operation time of the driving circuit to said predetermined time when said shutter release member is in the first state.

14. Apparatus according to claim 13 wherein the driving circuit drives the optical system by an amount corresponding to the detection result of the focus detection circuit, and wherein said control circuit controls the maximum time of the driving operation to the predetermined time.

15. A camera wherein a releasing operation for each frame is repeatedly performed when a shutter release member is in a predetermined operating state, and wherein a focus detection circuit performs a focus detection operation and a driving circuit performs a driving operation of optical means a predetermined number of times, comprising:

a restriction circuit for restricting the driving operation of the driving circuit to a predetermined time period.

16. A camera according to claim 15 wherein said restriction circuit comprises a time which causes the driving circuit to drive the optical system during the predetermined time period after a completion of the detecting operation by the focus detecting circuit, and wherein said focus detection operation is performed only once.

17. Apparatus for use in a camera having a shutter release member, an imaging optical system, a focus detecting circuit for detecting the focus state of the optical system, and a driving circuit for driving the optical system to place it in focus, the shutter release member having (1) a first state wherein the focus detecting circuit and the driving circuit repeatedly detect the focus state of the optical system and drive it, and (2) a second state wherein a shutter releasing operation is repeatedly performed and the focus detecting circuit and the driving circuit detect the focus state and drive the optical system a predetermined number of times before the shutter releasing operation, comprising:

an accumulation type sensor which receives light from an object, and wherein the focus detection operation is performed on the basis of a signal accumulated by said sensor;

a restriction circuit for restricting a maximum time of the accumulation time of said sensor;

a control circuit for controlling the maximum time restricted by said restriction circuit so that the maximum time in the second shutter release member state is less than that in the first shutter release member state.

* * * * *

UNITED STATES PATENT AND TRADEMARK OFFICE
CERTIFICATE OF CORRECTION

PATENT NO. : 5,053,799

DATED : October 1, 1991

INVENTOR(S) : AKIRA AKASHI

It is certified that error appears in the above-identified patent and that said Letters Patent is hereby corrected as shown below:

TITLE PAGE
At [30] Foreign Application Priority Data:

Insert --[30] Foreign Application Priority Data
        Jan. 12, 1987  [JP]  Japan  62-4578
        Jan. 12, 1987  [JP]  Japan  62-4579
        Jan. 12, 1987  [JP]  Japan  62-4580--.

COLUMN 4:

Line 10, "LMR," (first occurrence) should read --LMF,--.

COLUMN 5:

Line 17, "SW1" should read --switch SW1--;
Line 18, "SW1" should read --switch SW1--;
Line 24, "SW1" should read --switch SW1--; and
Line 36, "SW1" should read --switch SW1--.

UNITED STATES PATENT AND TRADEMARK OFFICE
CERTIFICATE OF CORRECTION

PATENT NO. : 5,053,799

DATED : October 1, 1991

INVENTOR(S) : AKIRA AKASHI

It is certified that error appears in the above-identified patent and that said Letters Patent is hereby corrected as shown below:

COLUMN 6:

Line 4, "SW2" should read --switch SW2--;
    Line 7, "SW2" should read --switch SW2--;
    Line 19, "SW2" should read --switch SW2--;
    Line 22, "SW2" should read --switch SW2--;
    Line 45, "returns" should read --returns to--; and
    Line 65, "it" should read --so it--.

COLUMN 7:

Line 8, "PRMV flag" should read --flag PRMV--;
    Line 11, "SW1," should read --switch SW1,--;
    Line 16, "SRMV flag" should read --flag SRMV--;
    Line 24, " "judgement" " should read --"judgment"--, and
           " "judgement" " should read --"judgment"--; and
    Line 39, "LKVDI" should read --LMVDI--.

UNITED STATES PATENT AND TRADEMARK OFFICE
CERTIFICATE OF CORRECTION

PATENT NO. : 5,053,799
DATED : October 1, 1991
INVENTOR(S) : AKIRA AKASHI

It is certified that error appears in the above-identified patent and that said Letters Patent is hereby corrected as shown below:

COLUMN 8:

Line 21, "fowardly" should read --forwardly--;
    Line 59, "judgement" should read --judgment--; and
    Line 66, "SW1" should read --switch SW1--.

COLUMN 9:

Line 10, "First," should read --¶ First,--; and
    Line 18, "judgement" should read --judgment--.

COLUMN 10:

Line 6, "held" should be deleted;
    Line 19, "above, the" should read --, the--; and
    Line 55, "braching" should read --branching--.

COLUMN 11:

Line 9, "returned" should read --returned to--; and
    Line 56, "Steps 13," should read --Steps 113,--.

UNITED STATES PATENT AND TRADEMARK OFFICE
CERTIFICATE OF CORRECTION

PATENT NO. : 5,053,799
DATED : October 1, 1991
INVENTOR(S) : AKIRA AKASHI

It is certified that error appears in the above-identified patent and that said Letters Patent is hereby corrected as shown below:

COLUMN 12:

Line 1, "of the lens" should be deleted;
　　　Line 10, "the" should read --and the--;
　　　Line 13, "he" should read --the--;
　　　Line 16, "o" should read --of--; and
　　　Line 68, "the" (second occurrence) should be deleted.

COLUMN 13:

Line 5, "the" (first occurrence) should be deleted;
　　　Line 15, "mean time," should read --meantime,--;
　　　Line 17, "above" should read --able--;
　　　Line 55, "|DEF|>JFSFLD," should read --|DEF|>JFFLD,--; and
　　　Line 57, "|DEF|≤JFSFLD," should read --|DEF|≤JFFLD,--.

COLUMN 14:

Line 23, "time" should read --timer--.

UNITED STATES PATENT AND TRADEMARK OFFICE
CERTIFICATE OF CORRECTION

PATENT NO. : 5,053,799
DATED : October 1, 1991
INVENTOR(S) : AKIRA AKASHI

It is certified that error appears in the above-identified patent and that said Letters Patent is hereby corrected as shown below:

COLUMN 15:

Line 14, "$\phi 1,,$" should read --$\phi 1,$--.

COLUMN 16:

Line 58, "held" should be deleted; and
Line 64, "held" should be deleted.

COLUMN 17:

Line 3, " "judgment " should read --"judgment"--.

COLUMN 19:

Line 15, "return" should read --return to--;
Line 42, "SRMU" should read --SRMV--;
Line 52, "ar" should read --are--, and "y" should read --by--; and
Line 59, "no" should read --not--.

UNITED STATES PATENT AND TRADEMARK OFFICE
CERTIFICATE OF CORRECTION

PATENT NO. : 5,053,799
DATED : October 1, 1991
INVENTOR(S) : AKIRA AKASHI

It is certified that error appears in the above-identified patent and that said Letters Patent is hereby corrected as shown below:

COLUMN 20:

Line 2, "returned" should read --returned to--;
    Line 35, "driven" should read --driving--;
    Line 53, "driving," should read --driving--; and

COLUMN 21:

Line 38, "predetermined," should read --predetermined--;
    Line 45, "time" should read --timer--; and
    Line 56, "diving" should read --driving--.

COLUMN 22:

Line 17, "sue" should read --use--;
    Line 52, "of" should read --of the--; and
    Line 58, "time" should read --timer--.

Signed and Sealed this

Sixth Day of December, 1994

Attest:

BRUCE LEHMAN

Attesting Officer      Commissioner of Patents and Trademarks